United States Patent [19]

Bondzeit

[11] Patent Number: 5,030,938
[45] Date of Patent: Jul. 9, 1991

[54] UNIVERSAL TRAILER LIGHTING ADAPTER

[76] Inventor: Frederick Bondzeit, 1937 E. Ellis Cir., Mesa, Ariz. 85203

[21] Appl. No.: 493,937

[22] Filed: Mar. 15, 1990

[51] Int. Cl.$^5$ .............................................. B60Q 1/26
[52] U.S. Cl. .................................. 340/431; 340/458; 340/475; 315/77
[58] Field of Search .............. 340/458, 431, 457, 638, 340/475; 307/10.8; 315/77

[56] References Cited

U.S. PATENT DOCUMENTS

| | | | |
|---|---|---|---|
| 3,849,664 | 11/1974 | Bryant | 315/77 |
| 3,883,845 | 5/1975 | DeVita . | |
| 3,896,415 | 7/1975 | Carter, III . | |
| 3,970,860 | 7/1976 | Purdy | 340/431 X |
| 4,006,453 | 2/1977 | Bryant | 340/431 |
| 4,064,413 | 12/1977 | Andersen | 340/431 X |
| 4,173,751 | 11/1979 | Bryant | 340/458 |
| 4,325,052 | 4/1982 | Koerner . | |
| 4,405,190 | 9/1983 | Schroeder | 307/10.8 X |
| 4,751,431 | 6/1988 | Ducote | 307/10.8 X |
| 4,760,384 | 7/1988 | Vila-Mascot | 340/638 |

FOREIGN PATENT DOCUMENTS 2724358 11/1978 Fed. Rep. of Germany ...... 340/638

Primary Examiner—Joseph A. Orsino
Assistant Examiner—Brian R. Tumm
Attorney, Agent, or Firm—William E. Hein

[57] ABSTRACT

A universal trailer lighting adapter permits connection of the lighting systems of American trailers to either American or foreign motor vehicles. Circuitry employing complementary metal oxide semiconductor logic elements in cooperation with solid state switches results in negligible current drain from the motor vehicle battery when the motor vehicle is not in use. The circuitry is powered directly from the battery of the motor vehicle, thereby eliminating additional loading of the motor vehicle electrical components and wiring and assuring full brightness of on both the motor vehicle and the trailer. The circuitry is fused or current limited to protect the electrical systems of both the motor vehicle and trailer from shorts that may occur in the trailer lighting system. A light emitting diode is provided to indicate a malfunction in either the adapter circuitry or the trailer lighting system to the driver of the motor vehicle.

19 Claims, 3 Drawing Sheets

UNIVERSAL TRAILER LIGHTING ADAPTER

BACKGROUND AND SUMMARY OF THE INVENTION

This invention relates generally to trailers towed by motor vehicles and more specifically to a universal trailer lighting adapter that operates to interface the lighting system of either American or foreign motor vehicles to a towed trailer. Trailers of the type manufactured in the United States utilize combined, rear-mounted turn/stop lamps to signal the intentions of the driver of the towing motor vehicle to drivers of vehicles following the towed vehicle. In addition, this type of trailer generally includes multiple running lights mounted at the rear and on the sides thereof to render the vehicle visible at night or in conditions of limited visibility.

In the case of American motor vehicles that are directly compatible with trailers also manufactured in the United States, it has been the practice in the prior art to wire the trailer lighting circuits directly to the corresponding individual motor vehicle lighting circuits. There are several disadvantages associated with this prior art practice. The most significant disadvantage is that the electrical load placed on the motor vehicle lighting circuits is at least doubled. This condition will usually cause both the trailer and motor vehicle lamps to operate at reduced brightness, causing a potential safety hazard. Since the lighting circuits of most motor vehicles are not designed to carry these increased electrical loads, components such as switches, turn signal flashers, wiring, and fuses are all prone to premature failure. This failure generally results in the potentially dangerous loss of lighting in both the motor vehicle and the trailer. At a minimum, it is necessary to replace the original motor vehicle directional signal flasher with a heavy duty flasher to carry the increased load presented by the trailer lights while maintaining the proper flash rate. In addition, trailer lighting systems are prone to develop electrical shorts due to wiring abrasion and lamp socket corrosion resulting from the presence of salt and moisture. Since the prior art generally teaches connection of trailer lighting systems directly to the motor vehicle lighting system wiring, such shorts will act to immediately disable both the trailer and motor vehicle lighting systems and may present a hazardous situation if undetected.

Most foreign motor vehicles, as well as some American models, utilize separate brake and directional signal circuits and are therefore not compatible with American trailers. Given this common situation, some type of adapter is required to convert the motor vehicle's three lighting signals (brake, left turn, and right turn) to the two signals (brake/left turn and brake/right turn) that are used by the trailer. The prior art practice in this situation is to wire the taillight circuit of the motor vehicle directly to the taillight or running light circuit of the trailer.

Prior art methods for adapting trailer lighting systems to motor vehicle lighting systems generally fall into two categories. The first category of devices uses electromechanical relays to convert motor vehicle lighting signals to signals that are compatible with the trailer. These devices are directed to the problem of adapting the turn/brake signal circuitry of imported motor vehicles to American trailers. They usually provide for isolation of the trailer brake/left turn and brake/right turn lamps from the lighting system of the motor vehicle by supplying power to these trailer lamps directly from the motor vehicle battery. However, the trailer running lamps are not so isolated in these prior art adapter devices. These prior art devices are sometimes separately fused to protect the motor vehicle lighting system from trailer shorts. The second category of prior art adapter devices employs solid state diode logic to adapt imported motor vehicles to American trailers. In this situation, the adapter device is powered directly by the motor vehicle brake and directional lighting circuits and does not provide any isolation or fusing to protect the motor vehicle lighting system from shorts that occur in the trailer lighting system. Neither of the above-described types of prior art adapter devices addresses the need for isolation of the trailer running lights from the motor vehicle lighting system or the need for isolating and fusing trailer lighting systems that are to be connected to American motor vehicles.

It is therefore the principal object of the present invention to provide a universal trailer lighting adapter that permits connection of the lighting systems of American trailers to either American or foreign motor vehicles. This and other objects are accomplished in accordance with the illustrated preferred embodiments of the present invention by providing circuitry that employs complementary metal oxide semiconductor (CMOS) logic elements in cooperation with solid state switches, resulting in negligible current drain, in the nanoampere range, from the motor vehicle battery when the motor vehicle is not in use. The circuitry is powered directly from the battery of the motor vehicle, thereby eliminating additional loading of the motor vehicle electrical components and wiring and assuring full brightness of lamps on both the motor vehicle and the trailer. A separate amplifier is provided for the running lights of the trailer. The circuitry is fused or current limited to protect the electrical systems of both the motor vehicle and trailer from trailer shorts that may occur. A light emitting diode is provided to indicate a malfunction in either the adapter circuitry or the trailer electrical system to the driver of the motor vehicle.

DETAILED DESCRIPTION OF THE INVENTION

Figure 1:
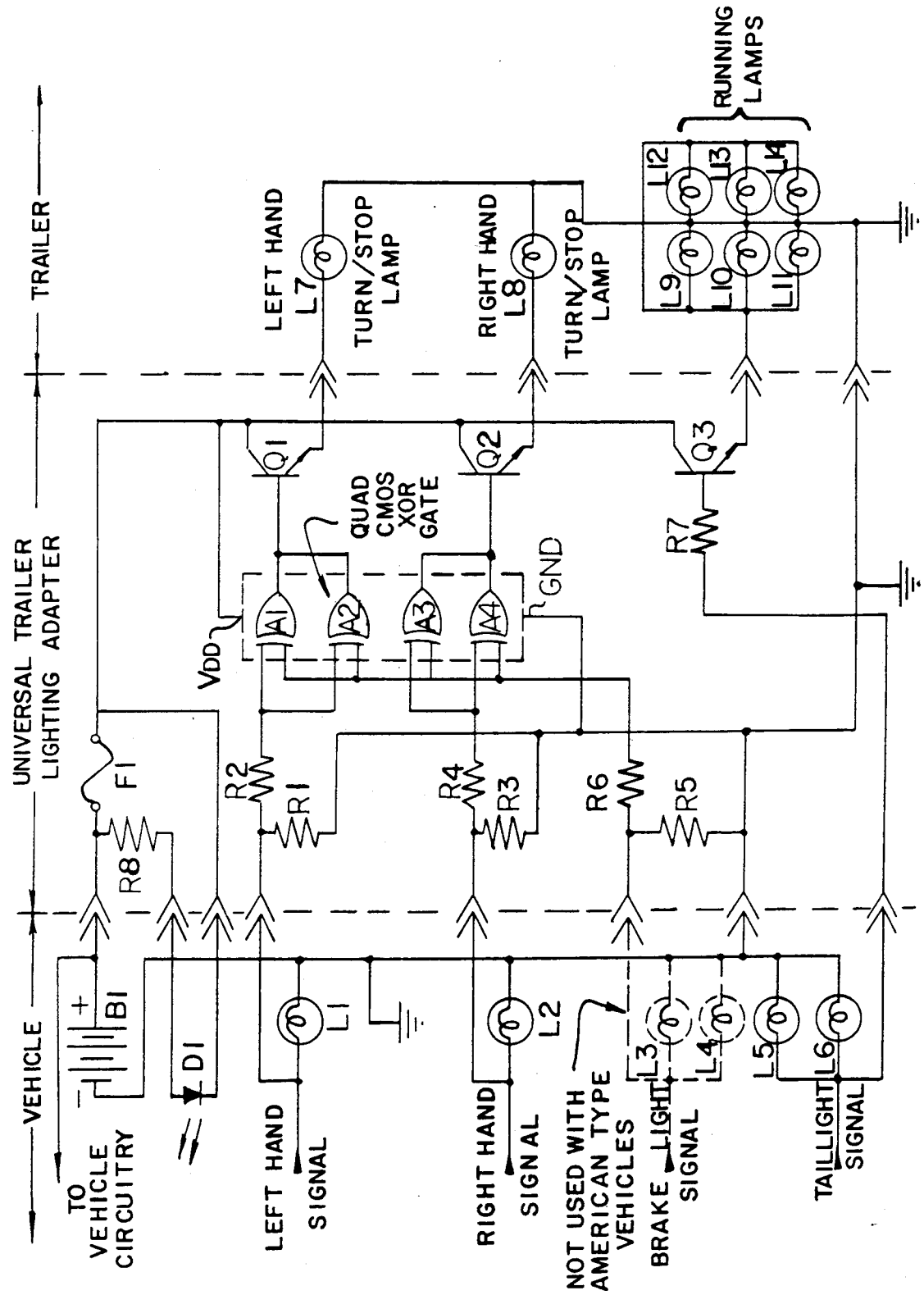
FIG. 1 is a detailed schematic diagram illustrating a universal trailer lighting adapter circuit constructed in accordance with the preferred embodiment of the present invention and also illustrating the interconnection thereof to the electrical systems of a towing motor vehicle and a towed trailer.
Figure 3:
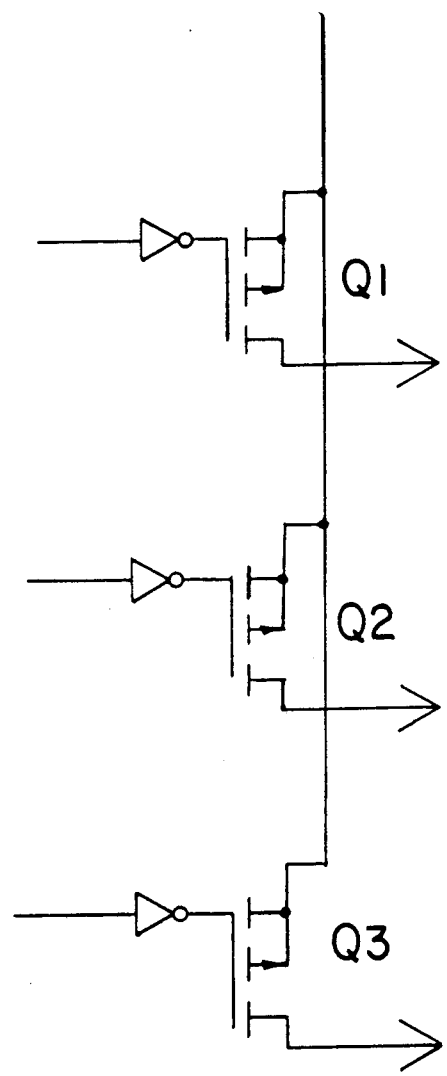
FIG. 3 is a schematic diagram illustrating the way in which power field effect transistors may be employed as the solid state switches Q1, Q2, and Q3 of FIGS. 1 and 2.

Referring now to FIG. 1, there is shown a circuit diagram of the universal trailer lighting adapter of the present invention and its connections to the electrical systems of a towing motor vehicle and a towed trailer. All electrical power for the lighting adapter and for the trailer lamps is supplied from a battery B1 contained within the motor vehicle. Battery B1 is the same battery that generally supplies electrical power to all electrical systems of the motor vehicle. Fuse F1 serves to fuse all current supplied by battery B1 for the lighting adapter and trailer lamps. Power transistors Q1, Q2, and Q3 supply current to the left turn/stop lamp L7, the right turn/stop lamp L8, and the running lamps L9-L14, respectively, of the trailer. Power transistors Q1, Q2, and Q3 may comprise, for example, power field effect transistors (FETs), as illustrated in FIG. 3, or Darlington pair transistors. Whenever the vehicle tail lamps L5, L6 are turned on, power transistor Q3 is turned on through resistor R7, thereby causing trailer running lamps L9-L14 to be illuminated. Resistor R7 acts to set the current gain of power transistor Q3. When the trailer lighting adapter is used with an American motor vehicle, the brake light signal connection is not used. In this case, when the motor vehicle left hand signal lamp L1 is turned on, the trailer left turn/stop lamp L7 will be illuminated by the portion of circuitry comprising resistors R1, R2, CMOS exclusive OR gates A1, A2, and power transistor Q1. Similarly, the trailer right turn/stop lamp L8 will be illuminated when the motor vehicle right hand signal lamp L2 is turned on, by the portion of circuitry comprising resistors R3, R4, CMOS exclusive OR gates A3, A4, and power transistor Q2. CMOS exclusive OR gates A1-A4 may comprise an inexpensive off-the-shelf quad exclusive OR integrated circuit. As illustrated in the schematic diagram of FIG. 1, exclusive OR gates A1, A2 are connected in parallel to provide additional drive for power transistor Q1. Similarly, exclusive OR gates A3, A4 are connected in parallel to drive power transistor Q2. Resistor pairs (R1, R2), (R3, R4), and (R5, R6) serve to protect the CMOS exclusive OR gates A1-A4 from failure due to static electric discharge and latchup. Both of these failure modes are peculiar to CMOS devices generally. A light emitting diode D1 is connected in series with a resistor R8 across fuse F1 to signal the driver of the motor vehicle that the fuse has blown and that the trailer lights are no longer operational.

When the trailer lighting adapter is employed with imported motor vehicles, the brake light signal from the motor vehicle is used. This signal is connected to both CMOS exclusive OR gates A1, A2 through the circuit comprising resistors R5, R6. With this arrangement, the motor vehicle left and right hand turn signals take precedence over the brake light signal.

Figure 2:
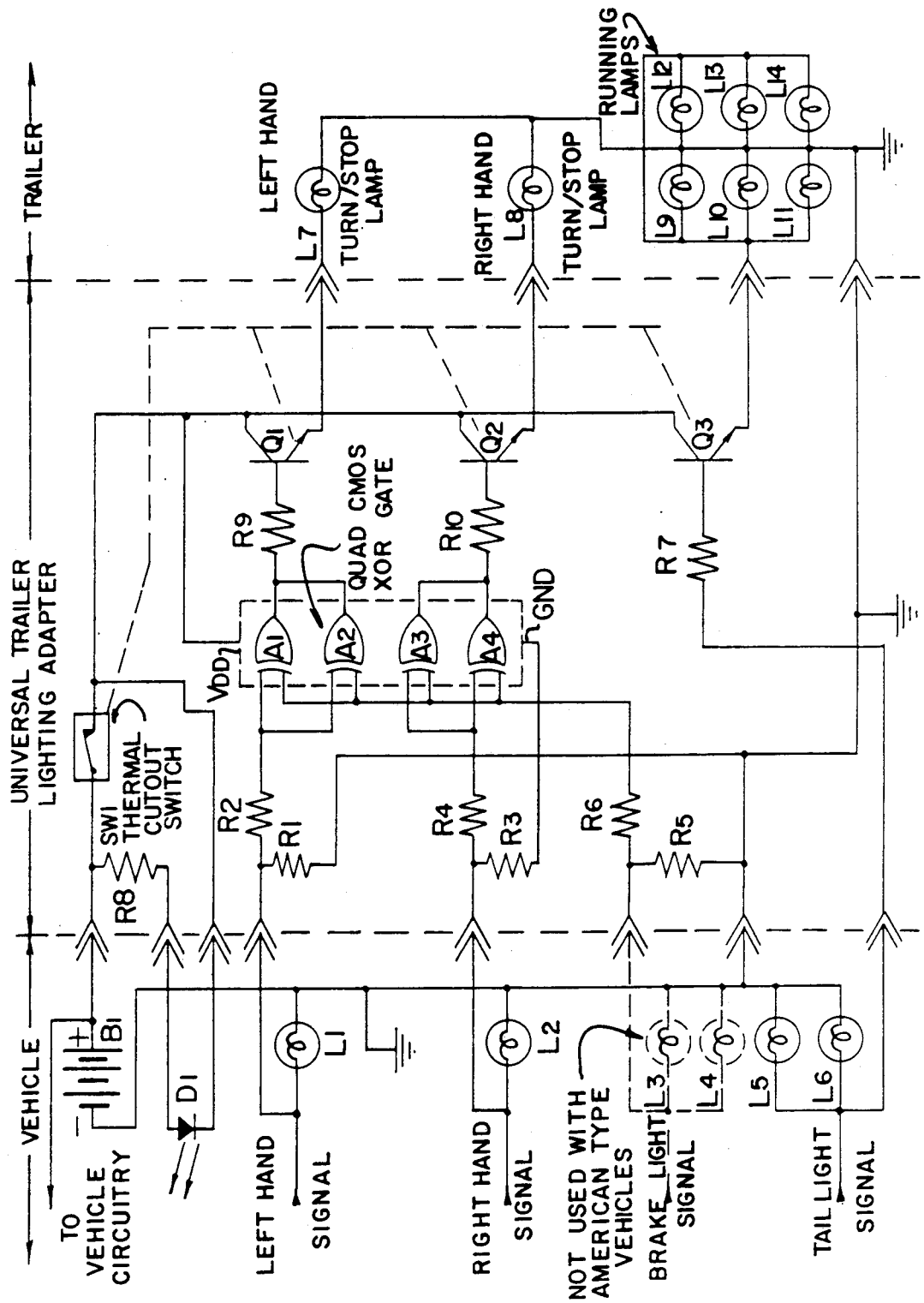
FIG. 2 is a detailed schematic diagram of the circuitry of FIG. 1 in which a fuse serving the universal trailer lighting adapter is replaced with a thermal cutout switch.

Referring now to the schematic circuit diagram of FIG. 2, there is shown the same circuit as illustrated in FIG. 1 except for the addition of resistors R9 and R10 and the replacement of fuse F1 with a thermal cutout switch SW1. Thermal cutout switch SW1 may be of the automatic or manual resetting type. Resistors R7, R9, and R10 act to limit the current gain of power transistors Q3, Q1, and Q2, respectively. The current in each of the power transistors Q1, Q2, Q3 is limited to a value which is below the continuous current rating of the device. Therefore, in the event of only single shorts in the trailer lighting system, the trailer lighting adapter will continue to function with the circuits that are unaffected. This is unlike fused systems in which a short will result in blowing the fuse and thereby render all of the trailer lights inoperative. Once the trailer short is corrected, the adapter will again function normally without the need for replacing a fuse. Constructionally, thermal cutout switch SW1 is mounted on a common heat sink with power transistors Q1, Q2, Q3 and serves to protect the battery B1 and the lighting adapter circuitry from damage due to excessive power dissipation in power transistors Q1, Q2, Q3. Such a fault condition may be caused by multiple shorts in the trailer wiring or by failure of components within the trailer lighting adapter circuitry itself. Light emitting diode D1 serves to indicate to the driver of the motor vehicle that the thermal cutout switch SW1 is open.

As stated hereinabove, the trailer lighting adapter of the present invention is universal in that it can be used interchangeably with either American or imported motor vehicles without modification. It can be transferred from one type of vehicle to another as the need arises. In addition, it draws negligible power from the motor vehicle to which it is connected when the vehicle is not in use. It may therefore be permanently connected directly to the motor vehicle battery. This feature permits easy installation not requiring a fused circuit for each unique vehicle installation. Further, the trailer lighting adapter of the present invention completely isolates the entire lighting system of the trailer from that of the motor vehicle. Since all signal inputs to the adapter are buffered and the source of power is separately protected, the motor vehicle electrical system is protected from shorts that may occur in the trailer lighting system.

I claim:

1. A universal trailer lighting adapter for interconnecting the battery and lighting system of either an American or foreign motor vehicle to the lighting system of a towed trailer that has a plurality of running lights, a left turn/stop lamp, and a right turn/stop lamp, the universal trailer lighting adapter comprising:

first input connection means for receiving a left turn signal from the lighting system of the motor vehicle;

second input connection means for receiving a right turn signal from the lighting system of the motor vehicle;

third input connection means for selectively receiving a brake light signal from the lighting system of the motor vehicle;

fourth input connection means for receiving a taillight signal from the lighting system of the motor vehicle;

driver means, coupled to said first, second, and third input connection means, and having inputs for selectively receiving said left turn signal, said right turn signal, and said brake light signal;

power connection means, including fuse means, coupled to the battery of the motor vehicle, for receiving operating power from said battery;

first solid state switch means, coupled to a first output of said driver means, said power connection means, and said left turn/stop lamp of the towed trailer, for supplying operating power to said left turn/stop lamp in response to either of said left turn signal or said brake light signal;

second solid state switch means, coupled to a second output of said driver means, said power connection means, and said right turn/stop lamp of the towed trailer, for supplying operating power to said right turn/stop lamp in response to either of said right turn signal or said brake light signal;

third solid state switch means, coupled to said fourth input connection means and said power connection means, for supplying operating power to said running lamps in response to said taillight signal; and indicator means, coupled across said fuse means, for providing a failure indication to the driver of the motor vehicle.

2. A universal trailer lighting adapter as in claim 1 wherein said first, second, and third solid state switch means comprise power field effect transistors.

3. A universal trailer lighting adapter as in claim 1 wherein said first, second, and third solid state switch means comprise Darlington pair power transistors.

4. A universal trailer lighting adapter as in claim 1 wherein said driver means comprises a plurality of complementary metal oxide semiconductor exclusive OR gates.

5. A universal trailer lighting adapter as in claim 4 wherein said plurality of complementary metal oxide semiconductor exclusive OR gates comprises a quad exclusive OR CMOS integrated circuit.

6. A universal trailer lighting adapter as in claim 5 wherein pairs of exclusive OR gates within said quad exclusive OR CMOS integrated circuit are connected in parallel.

7. A universal trailer lighting adapter as in claim 4 further comprising resistor protection means connected between an input of each of said plurality of complementary metal oxide semiconductor exclusive OR gates and a ground terminal to protect said plurality of complementary metal oxide semiconductor exclusive OR gates from failure due to static electric discharge.

8. A universal trailer lighting adapter as in claim 1 wherein said indicator means comprises a resistor and a light emitting diode serially connected across said fuse means.

9. A universal trailer lighting adapter for interconnecting the battery and lighting system of either an American or foreign motor vehicle to the lighting system of a towed trailer that has a plurality of running lights, a left turn/stop lamp, and a right turn/stop lamp, the universal trailer lighting adapter comprising:

first input connection means for receiving a left turn signal from the lighting system of the motor vehicle;

second input connection means for receiving a right turn signal from the lighting system of the motor vehicle;

third input connection means for selectively receiving a brake light signal from the lighting system of the motor vehicle;

fourth input connection means for receiving a taillight signal from the lighting system of the motor vehicle;

driver means, coupled to said first, second, and third input connection means, and having inputs for selectively receiving said left turn signal, said right turn signal, and said brake light signal;

power connection means, including thermal cutout switch means, coupled to the battery of the motor vehicle, for receiving operating power from said battery;

first solid state switch means, coupled to a first output of said driver means, said power connection means, and said left turn/stop lamp of the towed trailer, for supplying operating power to said left turn/stop lamp in response to either of said left turn signal or said brake light signal;

second solid state switch means, coupled to a second output of said driver means, said power connection means, and said right turn/stop lamp of the towed trailer, for supplying operating power to said right turn/stop lamp in response to either of said right turn signal or said brake light signal;

third solid state switch means, coupled to said fourth input connection means and said power connection means, for supplying operating power to said running lamps in response to said taillight signal; and indicator means, coupled across said thermal cutout switch means, for providing a failure indication to the driver of the motor vehicle.

10. A universal trailer lighting adapter as in claim 9 wherein said first, second, and third solid state switch means comprise power field effect transistors.

11. A universal trailer lighting adapter as in claim 9 wherein said first, second, and third solid state switch means comprise Darlington pair power transistors.

12. A universal trailer lighting adapter as in claim 9 wherein said driver means comprises a plurality of complementary metal oxide semiconductor exclusive OR gates.

13. A universal trailer lighting adapter as in claim 12 wherein said plurality of complementary metal oxide semiconductor exclusive OR gates comprises a quad exclusive OR CMOS integrated circuit.

14. A universal trailer lighting adapter as in claim 13 wherein pairs of exclusive OR gates within said quad exclusive OR CMOS integrated circuit are connected in parallel.

15. A universal trailer lighting adapter as in claim 13 further comprising resistor protection means connected between an input of each of said plurality of complementary metal oxide semiconductor exclusive OR gates and a ground terminal to protect said plurality of complementary metal oxide semiconductor exclusive OR gates from failure due to static electric discharge.

16. A universal trailer lighting adapter as in claim 9 wherein said indicator means comprises a resistor and a light emitting diode serially connected across said thermal cutout switch means.

17. A universal trailer lighting adapter as in claim 9 further comprising resistor means connected to an input of each of said first, second, and third solid state switch means for limiting a flow of current in each of said first, second, and third solid state switch means.

18. A universal trailer lighting adapter as in claim 17 further comprising common heat sink means on which said first, second, and third solid state switch means and said thermal cutout switch means are mounted and wherein said thermal cutout switch means is operative for sensing the temperature of said common heat sink means and for interrupting the flow of current from said battery when said temperature reaches a critical temperature.

19. A universal trailer lighting adapter as in claim 17 wherein said thermal cutout switch means is operative for automatically resetting itself, following interruption of the flow of current from said battery, to restore the flow of current from said battery at such time as said common heat sink means has cooled to a temperature below said critical temperature.

* * * * *